United States Patent
Abdelmalek et al.

(10) Patent No.: US 12,212,500 B2
(45) Date of Patent: Jan. 28, 2025

(54) PACKET FLOW DESCRIPTION (PFD) MANAGEMENT METHOD AND APPARATUS

(71) Applicant: VERIZON PATENT AND LICENSING INC., Basking Ridge, NJ (US)

(72) Inventors: Yousef Abdelmalek, New Providence, NJ (US); Ye Huang, San Ramon, CA (US); Parry Cornell Booker, Sunnyvale, TX (US)

(73) Assignee: Verizon Patent and Licensing, Basking Ridge, NJ (US)

( * ) Notice: Subject to any disclaimer, the term of this patent is extended or adjusted under 35 U.S.C. 154(b) by 367 days.

(21) Appl. No.: 17/818,559

(22) Filed: Aug. 9, 2022

(65) Prior Publication Data
US 2024/0056395 A1 Feb. 15, 2024

(51) Int. Cl.
*H04L 47/2475* (2022.01)
(52) U.S. Cl.
CPC .................. *H04L 47/2475* (2013.01)
(58) Field of Classification Search
None
See application file for complete search history.

(56) References Cited

U.S. PATENT DOCUMENTS

| | | | |
|---|---|---|---|
| 2022/0224650 A1* | 7/2022 | Xu | H04L 63/0236 |
| 2023/0077340 A1* | 3/2023 | Han | H04L 67/51 709/224 |
| 2023/0208730 A1* | 6/2023 | Puente Pestaña | H04W 24/02 709/220 |
| 2023/0300041 A1* | 9/2023 | Muñoz De La Torre Alonso | H04L 41/5041 709/224 |
| 2023/0379261 A1* | 11/2023 | Jian | H04L 65/1066 |
| 2024/0276300 A1* | 8/2024 | Xu | H04W 28/0967 |

* cited by examiner

*Primary Examiner* — Quang N Nguyen (57) ABSTRACT

Techniques for packet flow description (PFD) management are disclosed. In one embodiment, a method is disclosed comprising receiving, by a network exposure function (NEF), a packet flow description (PFD) management request via an application function (AF), the PFD management request, the PFD management request comprising application identification information identifying an application, using, by the NEF, the application identification information to identify a set of unified data repositories (UDRs) affected by the PFD management request, and instructing, by the NEF, at least one UDR of the set of UDRs to make a PFD change to the identified application's application data in accordance with the PFD management request.

14 Claims, 5 Drawing Sheets

PACKET FLOW DESCRIPTION (PFD) MANAGEMENT METHOD AND APPARATUS

BACKGROUND INFORMATION

A PFD (Packet Flow Description) can contain information that can be used for detection and management of application traffic on a communications network, such as a 3GPP (3$^{rd}$ Generation Partnership Project) 5G (Fifth Generation) communications network. By way of some non-limiting examples, PFDs can be used for traffic detection and filtering, e.g., by NFs (Network Functions) such as SMFs (Session Management Functions) and UPFs (User Plane Functions).

PFDs can be used by an entity (e.g., a third party such as an Application Service Provider, or ASP) to provide packet filters for services related to the entity. An NEF (Network Exposure Function) provides an API (Application Programming Interface) that can be used by an AF (Application Function) representing an entity, such as the ASP, to manage the PFDs related to the entity.

A UDR (Uniform Data Repository) is an example of an NF that includes data storage (e.g., a database) for storing data for use by NFs. A UDR's data storage can include application data corresponding to a number of applications. By way of a non-limiting example, a UDR can store PFD(s) provided by an application in an application data store. Access to a UDR (e.g., access to its data storage including application data) can be offered as services to other NFs (e.g., an NEF, SMF, UPF, and the like).

DETAILED DESCRIPTION OF EXAMPLE EMBODIMENTS

Techniques for packet flow description (PDF) management are disclosed. Disclosed embodiments can be used to dynamically manage distribution of a PDF change (e.g., create, update or delete) to one or more UDRs for storage.

In accordance with one or more embodiments, an NEF can be configured to receive a PDF management request from an AF, identify each UDR impacted by the PDF management request, and cause each identified UDR to receive an instruction to change the identified application's application data in a respective data repository in accordance with the PFD management request. In accordance with one or more such embodiments, the identified application's application data in a given UDR can comprise at least one PFD corresponding to the application. By way of a non-limiting example, a PFD management change can involve creation of a new PFD, an update to an existing PFD, deletion of an existing PFD, etc.

Figure 1:
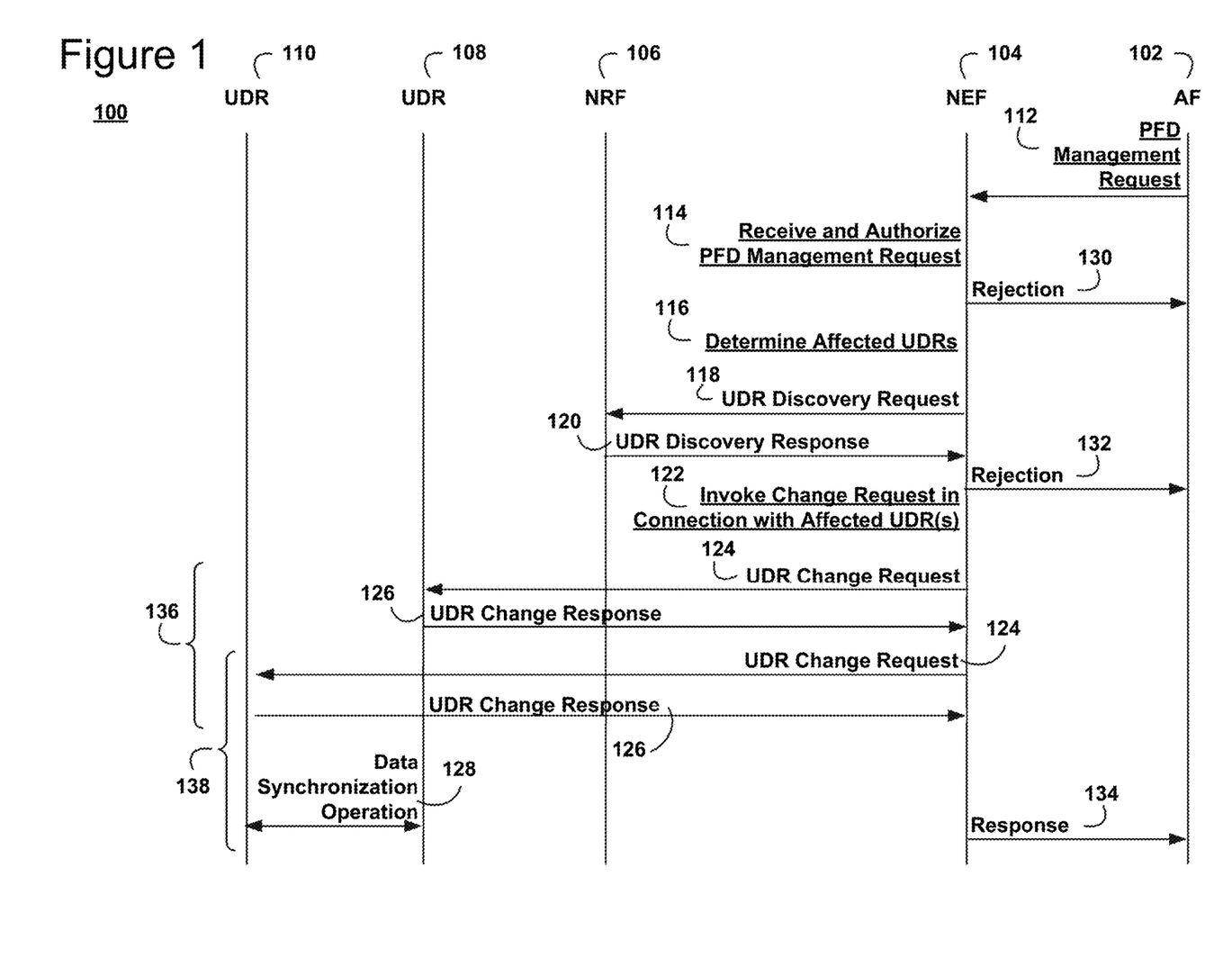
FIG. 1 provides an example of a PFD management procedure in accordance with one or more embodiments of the present disclosure.

FIG. 1 provides an example of a PFD management procedure in accordance with one or more embodiments of the present disclosure. In example 100 shown in FIG. 1, a network function, such as AF 102, invokes a PFD management function. AF 102 can host multiple applications and make PFD management requests 112 for each application. By way of a non-limiting example, AF 102 can make a PFD management request 112 to create, update or delete a PFD.

A PFD can comprise information for detection of application traffic. An entity, such as an ASP (Application Service Provider), can use a PFD to provide packet filters for services related to the entity. A PFD can be used by NFs, such as an SMF (Session Management Function), UPF (User Plane Function), PCF (Policy Control Function), in managing and detecting network traffic in connection with the entity.

An application can have a unique identifier (or application ID), and each PFD associated with an application can have a unique identifier (or PFD ID) that is unique in the scope of the application ID.

As discussed below, NEF can expose an API (or PFD Management API, or NNEF) that can be used to receive a PFD management request 112 and to communicate a response (e.g., rejections 130 and 132 and response 134) to the PFD management request 112. By way of a further non-limiting example, a NF (Network Function), such as AF 102, can make, or send, PFD management request 112 to NEF 104. By way of a non-limiting example, AF 102 can use the PFD Management API to make the PFD Management request 112.

By way of a further non-limiting example, the PFD management request 112 made by AF 102 (and received by NEF 104) can be made using one of the following functions in the NNEF API: Nref_PFDManagement_Create to create one or more PFDs, Nref_PFDManagement_Update to update one or more PFDs, or Nref_Management_Delete to delete one or more PFDs. The request 112 can comprise information identifying an application, such as an ApplicationID, and information identifying each PFD (including a PFD ID) to be managed.

In example 100, NEF 104 receives and authorizes 114 the PFD management request 112. By way of a non-limiting example, NEF 104 can authorize the PFD management request 112 by determining, or confirming, whether or not AF 102 is authorized to make PFD management request 112. By way of a non-limiting example, NEF can use an OAuth2-based authorization mechanism to determine whether or not AF 102 is authorized to make PFD management request 112. It should be apparent that any type of authorization can be used with embodiments of the present disclosure.

As shown in example 100, if AF 102 is determined, by NEF 104, to lack authorization to make the PFD management request 112, NEF 104 can send rejection 130 in response to the PFD management request 112.

On the other hand, if AF 102 is determined, by NEF 104, to have authorization to make PFD management request 112, NEF 104 can determine the affected UDRs, as indicated by reference 116. In accordance with one or more embodiments, NEF 104 determines each UDR that stores application data in connection with the application identified by information included in the PFD management request 112.

Figure 2:
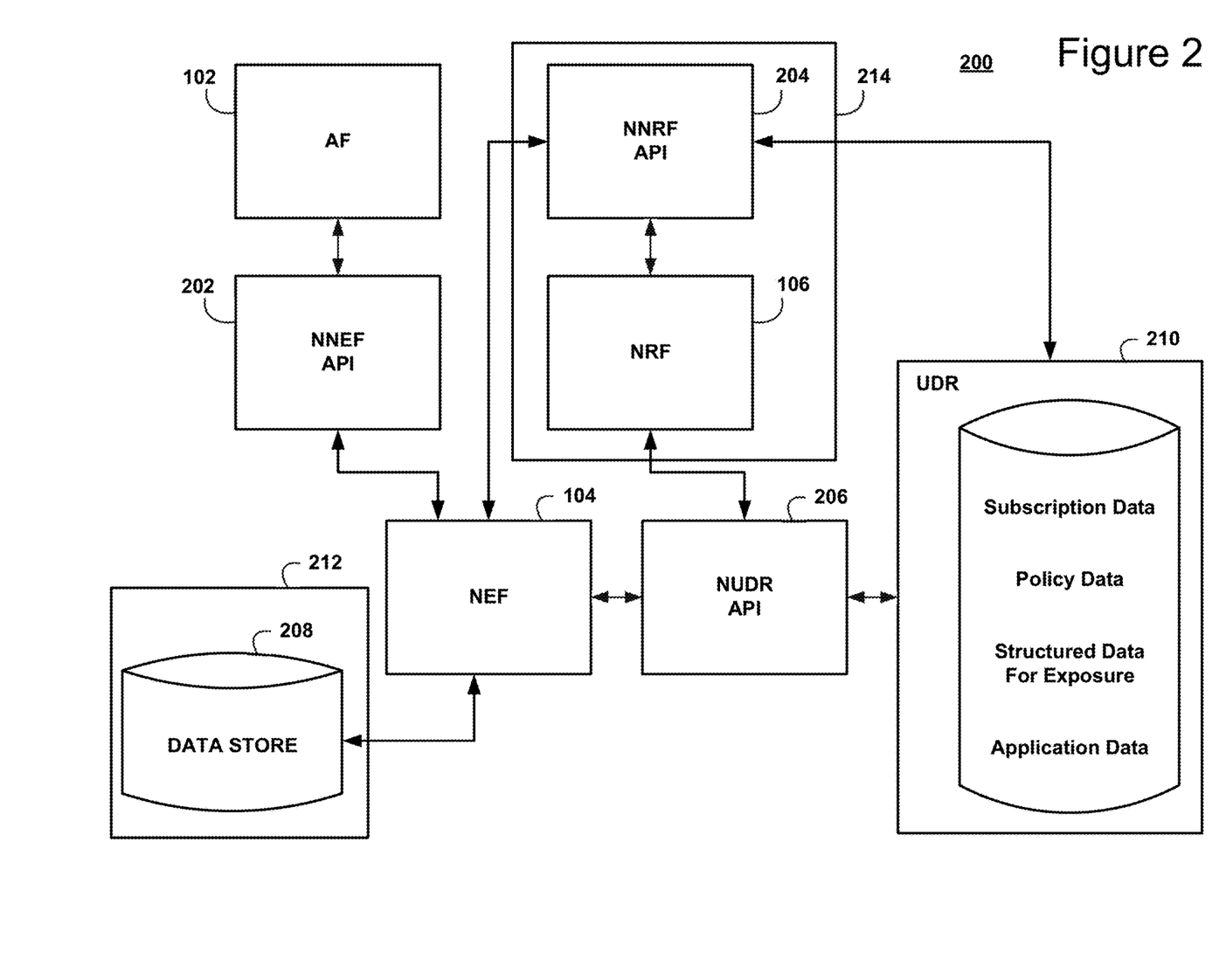
FIG. 2 illustrates exemplary components of a 5G system architecture in accordance with one or more embodiments of the present disclosure.

FIG. 2 illustrates exemplary components of a 5G system architecture in accordance with one or more embodiments of the present disclosure. Example 200 of FIG. 2 illustrates two different UDR discovery sources that can be used by NEF 104 to identify the affected UDRs.

With reference to FIG. 2, each affected UDR can be determined using UDR discovery sources 212 and 214. UDR discovery source 212 comprises a data store 208 associated with NEF 104. In accordance with one or more embodiments, NEF 104 can be configured to store information identifying each UDR corresponding to a given application. At least initially, NEF 104 can be preconfigured with the information stored in data store 208. By way of a non-limiting example, data store 208 can comprise information associating each UDR supporting the application identified in PDF management request 112. A UDR that supports the identified application can be configured to store application data corresponding to the identified application.

By way of a non-limiting example, NEF 104 can use data store 208 to store information associating a given application to each UDR that supports (e.g., stores data in connection with) the application (e.g., the application identified by the PFD management request 112) to determine each UDR impacted by the PFD management request 112. By way of a non-limiting example, the data store can be a table (e.g., a look up table, one or more database tables, etc.).

With UDR discovery source 212, NEF 104 can register with NRF 106 to receive any change in application support in connection with any UDR and the identified application. The change in application support can comprise an addition of a UDR to support the identified application and/or the removal of a UDR that no longer supports the identified application. NEF 104 can update the information stored in data store 208 in accordance with any such change in support.

UDR discovery source 214 involves NEF 104 requesting information identifying the impacted UDRs from NRF (Network Function Repository Function) 106. NRF 106 can store information identifying a number of UDRs supporting a given application. In accordance with one or more embodiments, NEF 104 can use information maintained by NRF 106 to identify UDRs that support a given application (e.g., the application identified in the PFD management request 112). In accordance with one or more embodiments, NEF 104 can submit UDR discovery request 118 to NRF 106.

The request 118 can comprise the application ID (or other information identifying the application) provided in the PFD management request 112. UDR discovery response 120 can be received by NEF 104 from NRF 106 in response to the UDR discovery request 118. By way of a non-limiting example, UDR discovery response 120 can comprise information identifying each UDR supporting the application identified in the UDR discovery request 118.

NEF 104 can determine (using at least one of UDR discovery source 212, 214) that there are no UDRs affected by the PFD management request 112. By way of a non-limiting example, using UDR discovery source 212) NEF 104 can query data store 208 to determine that there are no affected UDRs. By way of a further non-limiting example, using UDR discovery source 214, NEF 104 can receive a response (e.g., UDR discovery response 120) indicating that there are no affected UDRs.

In a case that NEF 104 (using one or both UDR discovery sources 212 and 214) determines that there are no affected UDRs, NEF 104 can send (e.g., in response to PFD management request 112) rejection 132 to AF 102 indicating that there are no UDRs storing PFDs for the application identified in the PFD management request 112.

In example 100 of FIG. 1, UDRs 108 and 110 can be identified as storing application data for (or supporting) the application identified in the PFD management request 112. As discussed, NEF 104 can identify each affected UDR using UDR discovery source 214 (which involves querying the NRF 106 using UDR discovery request 118 and receiving UDR discovery response 120), using UDR discovery source 212 (which involves querying one or more data stores 208 to obtain information maintained by NEF 104), or some combination thereof.

As indicated by reference 122, NEF 104 can invoke a change request in connection with the affected UDRs. The affected UDRs are those identified using one or both of UDR discovery sources 212 and 214.

In accordance with one or more embodiments, NEF 104 can use different UDR management options to request a change to each UDR identified using UDR discovery source 212 and/or 214. In example 100, with UDR management option 138, NEF 104 can submit a UDR change request 124 to each affected UDR 108, 110. Using UDR management option 138, NEF 104 can submit a UDR change request 124 to one of the UDRs in example 100 and rely on that UDR to synchronize the change with the other UDR in example 100.

With UDR management option 136 in example 100, NEF 104 can send a UDR change request 124 to each UDR (e.g., UDRs 108 and 110) affected by the PFD Management Request 112. NEF 104 receives a UDR change response 126 from UDRs 108 and 110 in response to the UDR change request 124.

In example 100, with UDR management option 138, NEF 104 can send UDR change request 124 to UDR 110, which then synchronizes with UDR 108 using data synchronization operation 128. Data synchronization operation 128 can be used to update UDR 108 with the PFD changes made to UDR 110 in accordance with PFD management request 112.

NEF 104 can use UDR management option 136, UDR management option 138 or some combination thereof to update each impacted UDR (e.g., UDRs 108, 110, 210) in accordance with PFD management request 112.

NEF 104 can send response 134 indicating an outcome in response to the PFD management request 112.

Referring again to FIG. 2, UDR 210 can be UDR 108 or 110. UDR 210 can store data including subscription data, policy data, structured data for exposure, and application data.

The application data stored in UDR 210 can include PFDs managed using NEF 104.

In example 200, AF 102 can use NNEF API 202 to make PFD management request 112. NEF 104 can receive the PFD management request 112 via the NNEF API 202. NEF 104 can use at least one of UDR discovery sources 212 and 214 to determine each affected UDR (e.g., UDRs 108, 110, 210).

With reference to UDR discovery source 214, NEF 104 can query NRF 106 using NNRF API 204 to obtain a list of affected UDRs. By way of a non-limiting example, NEF 104 can submit UDR discovery request 118 to NRF 106 and receive a UDR discovery response 120 from NRF 106 via NNRF API 204. NEF 104 can use NUDR API 206 to query, create, delete, and update application data (e.g., query, create, delete or update PFD application data) of UDR 210.

The NNEF API 202 used by AF 102 can be a REST (Representational State Transfer), or RESTful, API. The AF 102 can invoke the PFD Management Request 112 using an HTTP (Hypertext Transport Protocol) POST method (or message), which can use the following exemplary form:

POST ../3gpp-pfd-management/v/{scsASId}/transactions
   (PfdManagement/v/sm-policies/{smPolicyId}/modify
   (SmPolicy/UpdateContextData AF 102 can use the POST message to send the PFD Management Request 112 with PFD data to NEF 104. The POST message can comprise the application ID and the PFD data can comprise information identifying the PFDs to be changed and the changes to the identified PFD(s) for the identified application.

Using NRF 106 and UDR discovery source 214, NNRF API 204 can be used by NEF 104 to communicate UDR discovery request 118 and receive UDR discovery response 120 in response to the request. NNRF 204 can comprise a RESTful API. UDR discovery request 118 can be made by NEF 104 using an HTTP GET method, which can use the following exemplary form:

GET ../nnrf-disc/v/nf-instances?target-nf-type=UDR &
   supportedDataset=Application NEF 104 can use the GET method to fetch information identifying each UDR affected by the PFD management request 112. The message can include information indicating the supported dataset (e.g., the "Application") corresponding to the PFDs being managed. The application ID can be provided by the AF 102 in the PFD management request 112.

The NUDR API 206 can be used by NEF 104 to make the changes to the application data stored in UDR 210 in accordance with PFD management request 112. NUDR API 206 can provide a RESTful API including a HTTP PUT method, which can be used by the NEF 104 to make the changes. The HTTP PUT message can use the following exemplary form:

PUT ../nudr-dr/v/application-data/
   pfd{appId}PfdDataForAppExt)

The HTTP PUT method can be used to replace existing data (e.g., an existing PFD stored in the application data of UDR 210). An HTTP POST method can be used to save a new PFD in the application data of UDR 210. An HTTP DELETE method can be used to delete existing PFD data stored in the application data of UDR 210.

The NEF 104 can receive UDR change response 126 from UDR 210 via NUDR API 206 indicating whether or not the change was successfully made.

As shown in example 200, NRF 106 can access data stored in UDR 210 using NUDR API 206.

In accordance with one or more embodiments, with UDR management option 136, NEF 104 can use NUDR API 206 to submit a UDR change request to each affected UDR 108, 110, 210. With UDR management option 136, NEF 104 can use NUDR API 206 to submit the UDR change request to a subset of the affected UDRs (e.g., UDR 110 in example 100) and rely on the subset of UDRs to synchronize each update (e.g., the updates to application data in accordance with the PFD management request 112) with any remaining UDRs affected by the PFD management request 112 using data synchronization (e.g., using data synchronization operation 128).

In example 200, with UDR management option 136, NEF 104 can use NUDR API 206 to transmit a UDR change request 124 to each UDR 210 affected by the PFD Management Request 112. NEF 104 can receive a UDR change response 126 from each UDR 210 to which it sent the UDR change request 124 via NUDR API 206.

With UDR management option 138, NEF 104 can send a UDR change request 124 to one or more UDRs 210 using NUDR API 206. The one or more UDRs 210 can use data synchronization operation 128 to synchronize with any affected UDRs not updated by NEF 104. As discussed in connection with example 100, data synchronization operation 128 can be used to update UDR 108 with the PFD changes made (in accordance with PFD management request 112) to UDR 110 (via UDR change request 124 transmitted by NEF 104 to UDR 110 using NUDR API 206).

In accordance with one or more embodiments, NEF 104 can use UDR management option 136, UDR management option 138 or some combination of options 136 and 138 to update UDRs affected by the PFD management request 112.

Figure 3:
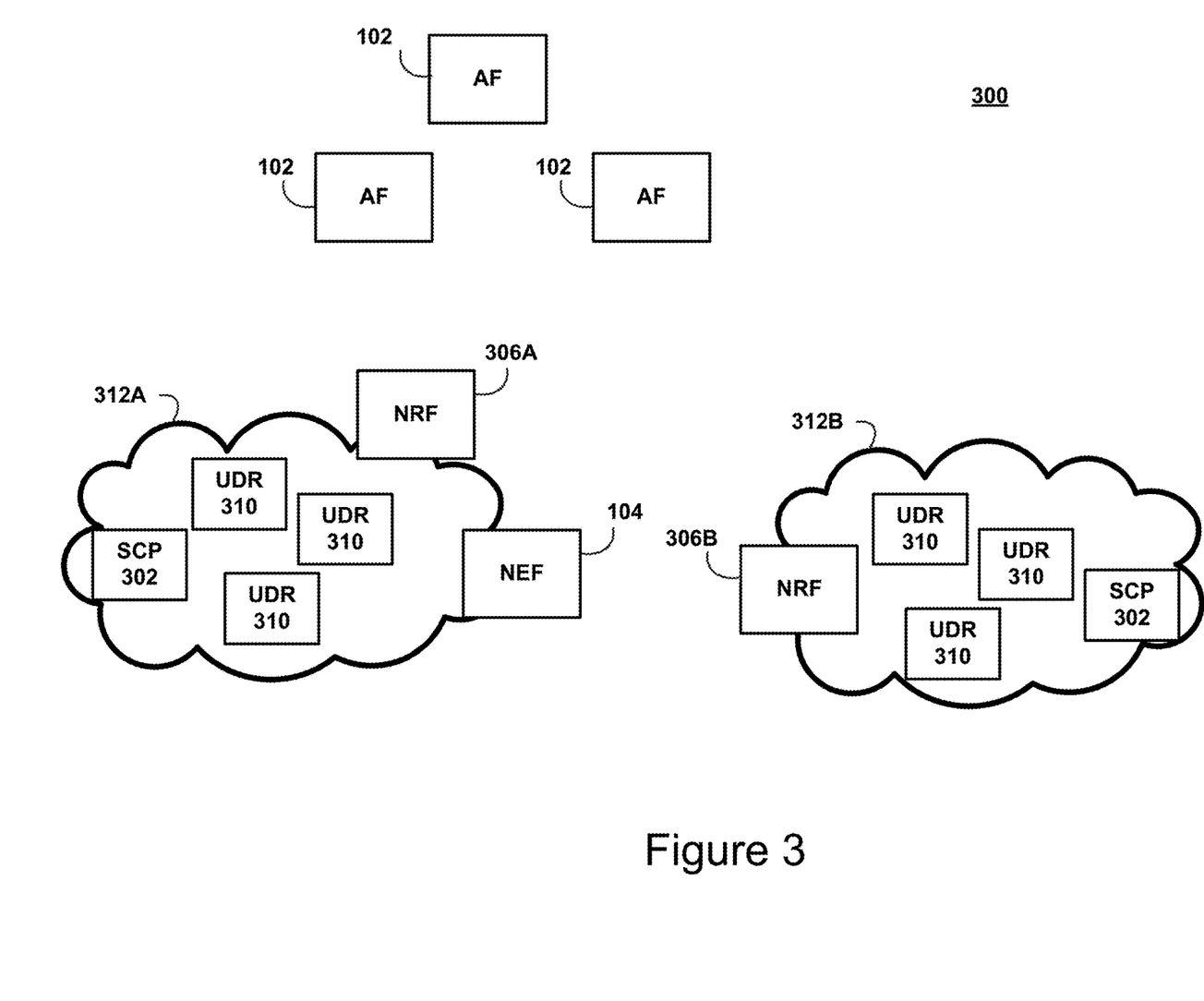
FIG. 3 provides an illustration of an exemplary network topology in accordance with one or more embodiments of the present application.

FIG. 3 provides an illustration of an exemplary network topology in accordance with one or more embodiments of the present application. In example 300, network segments 312A and 312B can each have resident UDRs 310. By way of a non-limiting example, network segments 312A and 312B can each be a network/partition (e.g., logical network/partition). Each one can comprise its own resources including various NFs.

By way of a further non-limiting example, in example 300, network segments 312A and 312B can each include a SCP (Service Communication Policy) 302. SCP 302 can be used to route messages between NFs shown in example 300. Additionally, each one can comprise other NFs, such as UDRs and NRFs. In example 300, network segment 312A includes NEF 104. While not shown in example 300, network segment 312B can comprise an NEF.

In example 300, network segments 312A and 312B each includes a number of UDRs 310. In accordance with embodiments of the present disclosure, NEF 104 can identify each UDR 310 affected by PFD management request 112 received from AF 102 even in a case that the affected UDRs 310 reside on multiple network segments.

As can be seen in example 300, the NEF 104 resides on network segment 312A. An affected UDR 310 can reside on one or both of network segments 312A and 312B. NEF 104 can use one or both of UDR discovery sources 212 and 214 to identify each affected UDR 310.

In accordance with one or more embodiments, data store 208 can be configured to comprise information identifying each affected UDR 310 residing on network segments 312A and 312B. Using UDR discovery source 212, NEF 104 can query data store 208 to identify each UDR 310 affected by the PFD management request 112 regardless of which network segment 312A and 312B the UDR 310 resides.

In accordance with one or more embodiments, NEF 104 can use UDR discovery source 214 to discovery each registered UDR 310 affected by the PFD management request 112. Each UDR 310 can register with one or both of NRFs 306A and 306B. Once registered with at least one of NRFs 306A and 306B, the registered UDR 310 becomes available for discovery by other NFs, including NEF 104.

By way of a non-limiting example, using an HTTP PUT message submitted via NNRF API 204, a UDR 310 can register with an NRF (e.g., one of NRFs 306A and 306B). The registration information provided by the UDR 310 can include information identifying each application (e.g., by application ID) that is being supported by the registering UDR 310. The NRF (e.g., NRF 306A or 306B) can receive the HTTP PUT message and store the information identifying each application supported by the registering UDR 310.

In accordance with one or more embodiments, NRF 306A and NRF 306B can register with each other using NNRF API 204. Once registered with each other, NRFs 306A and 306B become discoverable by other NFs, including NEF 104. By way of a non-limiting example, once NRF 306B is registered with NRF 306A, NEF 104 can query NRF 306A to discover NRF 306B.

In accordance with one or more embodiments, NEF 104 can query each discovered NRF (e.g., NRF 306B) to obtain information identifying each UDR 310 registered with the discovered NRF (e.g., NRF 306B) that is supporting the application identified in the PFD management request 112 received by NEF 104 from AF 102. By way of a non-limiting example, NEF 104 can query NRF 306B (which can be discovered via its registration with NRF 306A) to identify each UDR 310 registered with NRF 306B that is affected by the PDF management request 112.

In accordance with one or more embodiments, NEF 104 can use UDR discovery request 118 and UDR discovery response 120 (in accordance with the NNRF API 204) to query one or both of NRFs 306A and 306B to obtain information (e.g., a list) identifying each UDR 310 that supports the application specified in PFD management request 112.

By way of a further non-limiting example, NEF 104 can use an HTTP GET message (via NNRF API 204) to submit (to NRF 306A or 306B) a request for the information identifying each UDR 310 (registered with the queried NRF (e.g., NRF 306A or 306B) that is configured to store application data for the application identified in the PFD management request 112.

The HTTP GET message submitted by NEF 104 can include the application ID provided in the PFD management request 112. An HTTP response received by NEF 104 (from the queried NRF 306A or 306B) via NNRF API 204 can comprise information identifying each UDR 310 registered with the queried NRF (NRF 306A or 306B) that is configured to store, or is storing, application data for the application identified in the PFD management request 112.

As discussed, NEF 104 can use the information (e.g., a listing) identifying each registered UDR 310 supporting (e.g., configured to store, or is storing application data in connection with) the application identified the PFD management request 112 to cause each identified UDR to update its application data in accordance with the PFD management request 112.

As discussed herein, NEF 104 can use one or both of UDR management options 136 and 138 to invoke a change request in connection with each affected UDR (determined to support the identified application using one or both of UDR discovery sources 212 and 214). In accordance with one or more embodiments, UDR management option 136 can be used to transmit a UDR change request 124 to (and receive a UDR change response 126 from) each affected UDR 310.

Using UDR management option 138, NEF 104 can rely on data synchronization operation 128 to cause UDR application data (e.g., PFD) changes to be disseminated to an affected UDR 310 without sending a UDR change request 124 to (and receiving a UDR change response 126 from) the affected UDR 310.

In accordance with one or more embodiments, UDR management option 138 can be used to minimize the amount of network traffic needed to make the application data changes indicated by the PFD management request 112.

Using the network topology shown in example 300 for purposes of illustration, in one non-limiting scenario, to minimize network traffic between network segments 312A and 312B, NEF 104 can use UDR management option 136 to avoid sending a UDR change request 124 to (and receiving a UDR change response 126 from) each UDR affected by the PFD management request 112.

In example 300, NEF 104 does not reside on network segment 312B, and sending a UDR change request 124 to (and receiving a UDR change response 126 from) each affected UDR 310 residing on network segment 312B can result in significant inter-segment network traffic. As such, in a case that more than one UDR 310 residing on network segment 312B is affected by the PFD management request 112, NEF 104 can use UDR management option 138 to send UDR change request 124 to one (or more) of the affected UDRs 310 residing on network segment 312B and then allow the update(s) to be disseminated to each remaining UDR 310 (residing on network segment 312B) affected by the PFD management request 112 via data synchronization operation 128.

In accordance with one or more embodiments, NEF 104 can determine whether it is more expedient (e.g., in terms of network resources) to use UDR management option 136 or 138 (or some combination) in connection with the affected UDRs 310 residing on one or both of network segments 312A and 312B.

Figure 4:
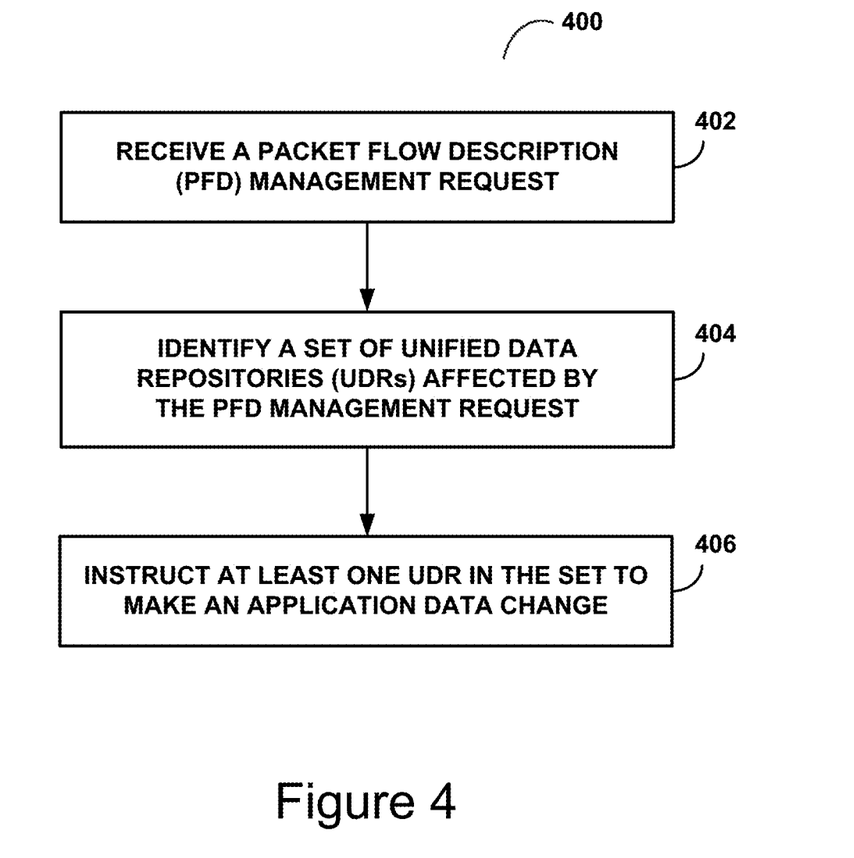
FIG. 4 provides a PFD management process flow in accordance with one or more embodiments of the present disclosure.

FIG. 4 provides a PFD management process flow in accordance with one or more embodiments of the present disclosure. In accordance with one or more embodiments, process 400 can be performed by NEF 104.

At step 402 of process 400, a packet flow description (PFD) management request is received. By way of a non-limiting example, PFD management request 112 can be received by NEF 104 from AF 102 at step 402. The PFD management request 112 can comprise application identification information (e.g., an application ID). The PFD management request 112 can be made in connection with a set of PFDs (comprising one or more PFDs) for the application identified in the PFD management request 112. The PFD management request 112 can comprise a request to change one or more PFDs. As discussed herein, the requested change can comprise a request to create a new PFD, update an existing PFD or delete an existing PFD.

At step 404, a set of unified data repositories (UDRs) affected by the PFD management request is identified. By way of a non-limiting example, NEF 104 can use the application identification information (e.g., application ID) included with the PFD management request 112 received at step 402 to identify the set of UDRs affected by the PFD management request 112. Each UDR in the set of UDRs affected by the PFD management request 112 can be configured to store application data (which can include PFDs) in connection with the application identified in the PFD management request 112 received at step 402.

NEF 104 can determine the set of UDRs using one or both of UDR discovery sources 212 and 214. Using UDR discovery source 212, NEF 104 can query a data store (e.g., data store 208) to identify one or more UDRs affected by the PFD management request 112. In accordance with one or more embodiments, NEF 104 can maintain data store 208. Data store 208 can comprise information associating a number of UDRs with the application identified in the PFD management request 112. In accordance with one or more embodiments, NEF 104 can use the information maintained in data store 208 to identify each UDR in the number of UDRs associated with the identified application.

In accordance with one or more embodiments, NEF 104 can be configured with information associating the number of UDRs with the identified application. In accordance with one or more embodiments, NEF 104 can register with NRF 106, 306A, 306B to receive any change in application support in connection with any UDRs and the identified application. The change in application support can comprise an addition of a UDR that supports the identified application and/or the removal of a UDR that no longer supports the identified application. NEF 104 can update the information maintained in data store 208 in accordance with any such change in support by a UDR.

Using UDR discovery source 214, NEF 104 can query NRF 106, 306A, 306B to retrieve information identifying a number of UDRs affected by the PFD management request 112 received at step 402. NEF 104 can use NNRF API 204 to communicate UDR discovery request 118 to NRF 106, 306A, 306B and receive UDR discovery response 120 from NRF 106, 306A, 306B. UDR discovery request 118 can comprise the information identifying the application received in the PFD management request 112 received at step 402. UDR discovery response 120 can comprise information identifying a number of UDRs supporting the application identified in the UDR discovery request 118.

At step 406, at least one UDR (e.g., UDR 108, 110, 210, 310) in the set of UDRs is instructed to make an application data change. In accordance with one or more embodiments, NEF 104 can use one or both of UDR management options 136 and 138 to instruct the set of UDRs to make the application data change indicated by the PFD management request received at step 402.

With UDR management option 138, NEF 104 can submit a UDR change request 124 to each affected UDR in the set of UDRs. Using UDR management option 138, NEF 104 can submit a UDR change request 124 to one (or more) of the UDRs in the set of UDRs and rely on the updated UDR(s) to synchronize the change with the other UDRs in the set of UDRs.

In accordance with one or more embodiments, NEF 104 can receive a UDR change response 126 from each UDR to which it sent a UDR change request 124. The UDR change response 126 can comprise information indicating whether or not the requested change was successfully made. NEF 104 can communicate, (e.g., using NNEF API 202) a response (e.g., response 134) to the AF (e.g., AF 102) making the PFD management request 112. Response 134 can comprise information indicating whether or not the change requested using the PFD management request 112 was successfully made.

In accordance with one or more embodiments, NEF 104 can receive the PFD management request and determine whether the requesting AF 102 is authorized to make the request before performing steps 404 and 406.

In accordance with one or more embodiments, the NFs (e.g., AF 102, NEF 104, NRF 106, UDR 108, UDR 106, etc.) can be implemented on one or more devices associated with a communications network (e.g., a 3GPP 5G communications network). In some exemplary implementations, one or more NFs can be implemented on physical devices, such as an access point, a base station, a gateway, and/or the like. In some exemplary implementations, one or more NFs can be implemented on a computing device (such as that described below in connection with FIG. 5). In some exemplary implementations the computing device can be implemented in a cloud computing environment.

Figure 5:
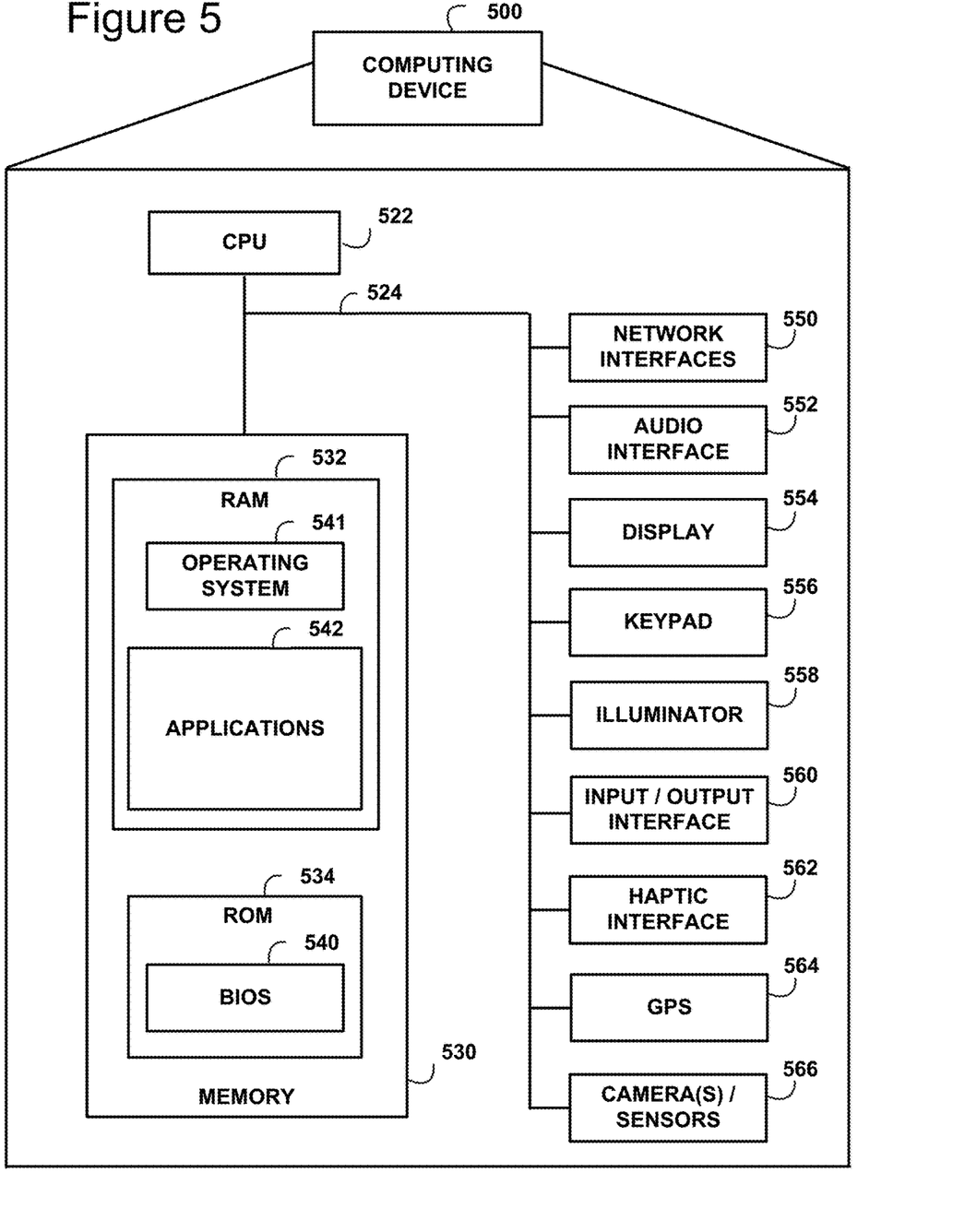
FIG. 5 provides a block diagram illustrating a computing device showing an example of client or server device used in accordance with one or more embodiments of the present disclosure.

FIG. 5 is a block diagram illustrating a computing device showing an example of a client or server device used in the various embodiments of the disclosure.

The computing device 500 may include more or fewer components than those shown in FIG. 5, depending on the deployment or usage of the device 500. For example, a server computing device, such as a rack-mounted server, may not include audio interfaces 552, displays 554, keypads 556, illuminators 558, haptic interfaces 562, GPS receivers 564, or cameras/sensors 566. Some devices may include additional components not shown, such as graphics processing unit (GPU) devices, cryptographic co-processors, artificial intelligence (AI) accelerators, or other peripheral devices.

As shown in FIG. 5, the device 500 includes a central processing unit (CPU) 522 in communication with a mass memory 530 via a bus 524. The computing device 500 also includes one or more network interfaces 550, an audio interface 552, a display 554, a keypad 556, an illuminator 558, an input/output interface 560, a haptic interface 562, an optional global positioning systems (GPS) receiver 564 and a camera(s) or other optical, thermal, or electromagnetic sensors 566. Device 500 can include one camera/sensor 566 or a plurality of cameras/sensors 566. The positioning of the camera(s)/sensor(s) 566 on the device 500 can change per device 500 model, per device 500 capabilities, and the like, or some combination thereof.

In some embodiments, the CPU 522 may comprise a general-purpose CPU. The CPU 522 may comprise a single-core or multiple-core CPU. The CPU 522 may comprise a system-on-a-chip (SoC) or a similar embedded system. In some embodiments, a GPU may be used in place of, or in combination with, a CPU 522. Mass memory 530 may comprise a dynamic random-access memory (DRAM) device, a static random-access memory device (SRAM), or a Flash (e.g., NAND Flash) memory device. In some embodiments, mass memory 530 may comprise a combination of such memory types. In one embodiment, the bus 524 may comprise a Peripheral Component Interconnect Express (PCIe) bus. In some embodiments, the bus 524 may comprise multiple busses instead of a single bus.

Mass memory 530 illustrates another example of computer storage media for the storage of information such as computer-readable instructions, data structures, program modules, or other data. Mass memory 530 stores a basic input/output system ("BIOS") 540 (e.g., as part of ROM 534) for controlling the low-level operation of the computing device 500. The mass memory also stores an operating system 541 for controlling the operation of the computing device 500.

Applications 542 may include computer-executable instructions which, when executed by the computing device 500, perform any of the methods (or portions of the methods) described previously in the description of the preceding Figures. In some embodiments, the software or programs implementing the method embodiments can be read from a hard disk drive (not illustrated) and temporarily stored in RAM 532 by CPU 522. CPU 522 may then read the software or data from RAM 532, process them, and store them to RAM 532 again.

The computing device 500 may optionally communicate with a base station (not shown) or directly with another computing device. Network interface 550 is sometimes known as a transceiver, transceiving device, or network interface card (NIC).

The audio interface 552 produces and receives audio signals such as the sound of a human voice. For example, the audio interface 552 may be coupled to a speaker and microphone (not shown) to enable telecommunication with others or generate an audio acknowledgment for some action. Display 554 may any and may also include a touch-sensitive screen arranged to receive input from an object such as a stylus or a digit from a human hand.

Keypad 556 may comprise any input device arranged to receive input from a user. Illuminator 558 may provide a status indication or provide light.

The computing device 500 also comprises an input/output interface 560 for communicating with external devices, using communication technologies, such as USB, infrared, Bluetooth™, or the like. The haptic interface 562 provides tactile feedback to a user of the client device.

The optional GPS transceiver 564 can determine the physical coordinates of the computing device 500 on the surface of the Earth, which typically outputs a location as latitude and longitude values. GPS transceiver 564 can also employ other geo-positioning mechanisms, including, but not limited to, triangulation, assisted GPS (AGPS), E-OTD, CI, SAI, ETA, BSS, or the like, to further determine the physical location of the computing device 500 on the surface of the Earth. In one embodiment, however, the computing device 500 may communicate through other components, provide other information that may be employed to determine a physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media can tangibly encode computer-executable instructions that when executed by a processor associated with a computing device perform functionality disclosed herein in connection with one or more embodiments.

Computer-readable storage media includes, but is not limited to, RAM, ROM, EPROM, EEPROM, flash memory or other solid-state memory technology, CD-ROM, DVD, or other optical storage, cloud storage, magnetic storage devices, or any other physical or material medium which can be used to tangibly store thereon the desired information or data or instructions and which can be accessed by a computer or processor.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user," "subscriber," "consumer," or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

The invention claimed is:

1. A method comprising:
receiving, by a network exposure function (NEF), a packet flow description (PFD) management request via an application function (AF), the PFD management request comprising application identification information identifying an application;
confirming, by the NEF, that the AF is authorized to make the PFD management request;
using, by the NEF, the application identification information to identify a set of unified data repositories (UDRs) affected by the PFD management request;
instructing, by the NEF, at least one UDR of the set of UDRs to make a PFD change to the identified application's application data in accordance with the PFD management request; and
transmitting, by the NEF to the at least one UDR in the set of UDRs, a UDR change request in accordance with the PFD management request, the at least one UDR capable of synchronizing with each other UDR in the set of UDRs.

2. The method of claim 1, the PFD change to the identified application's application data is selected from one of the following: a PFD create, PFD update or a PFD delete.

3. The method of claim 1, using further comprising:
making, by the NEF to a network function repository function (NRF), a request for information identifying a number of UDRs in the set of UDRs supporting the application, the request comprising the information identifying the application; and
receiving, by the NEF from the NRF, the information identifying the number of UDRs in the set of UDRs supporting the application.

4. The method of claim 1, further comprising:
maintaining, by the NEF, a data store comprising information associating a number of UDRs with the identified application; and
using, by the NEF, the information in the data store to identify each UDR in the number of UDRs.

5. The method of claim 4, the NEF being preconfigured with the information associating the number of UDRs in the set of UDRs with the identified application.

6. The method of claim 5, further comprising:
registering, by the NEF with a network function repository function (NRF), to receive any change in application support in connection with any UDRs and the identified application; and
updating, by the NEF, the information maintained by the NEF in the data store in accordance with any change in application support received from the NRF.

7. The method of claim 1, further comprising:
communicating, by the NEF, a response to the AF, the response comprising information indicating a completion status of the PFD management request.

8. A non-transitory computer-readable storage medium tangibly encoded with computer-executable instructions that when executed by a processor associated with a computing device perform a method comprising:
receiving, by a network exposure function (NEF), a packet flow description (PFD) management request via an application function (AF), the PFD management request comprising application identification information identifying an application;
confirming, by the NEF, that the AF is authorized to make the PFD management request;
using, by the NEF, the application identification information to identify a set of unified data repositories (UDRs) affected by the PFD management request;
instructing, by the NEF, at least one UDR of the set of UDRs to make a PFD change to the identified application's application data in accordance with the PFD management request; and
transmitting, by the NEF to the at least one UDR in the set of UDRs, a UDR change request in accordance with the PFD management request, the at least one UDR capable of synchronizing with each other UDR in the set of UDRs.

9. The non-transitory computer-readable storage medium of claim 8, the PFD change to the identified application's application data is selected from one of the following: a PFD create, PFD update or a PFD delete.

10. The non-transitory computer-readable storage medium of claim 8, using further comprising:
making, by the NEF to a network function repository function (NRF), a request for information identifying a number of UDRs in the set of UDRs supporting the application, the request comprising the information identifying the application; and
receiving, by the NEF from the NRF, the information identifying the number of UDRs in the set of UDRs supporting the application.

11. The non-transitory computer-readable storage medium of claim 8, the method further comprising:

maintaining, by the NEF, a data store comprising information associating a number of UDRs with the identified application; and using, by the NEF, the information in the data store to identify each UDR in the number of UDRs.

12. The non-transitory computer-readable storage medium of claim 11, the NEF being preconfigured with the information associating the number of UDRs in the set of UDRs with the identified application.

13. The non-transitory computer-readable storage medium of claim 12, the method further comprising:

registering, by the NEF with a network function repository function (NRF), to receive any change in application support in connection with any UDRs and the identified application; and updating, by the NEF, the information maintained by the NEF in the data store in accordance with any change in application support received from the NRF.

14. A device comprising:

a processor, configured to:

receive a packet flow description (PFD) management request via an application function (AF), the PFD management request comprising application identification information identifying an application;

confirm, by the NEF, that the AF is authorized to make the PFD management request;

use the application identification information to identify a set of unified data repositories (UDRs) affected by the PFD management request;

instruct at least one UDR of the set of UDRs to make a PFD change to the identified application's application data in accordance with the PFD management request; and transmit, by the NEF to the at least one UDR in the set of UDRs, a UDR change request in accordance with the PFD management request, the at least one UDR capable of synchronizing with each other UDR in the set of UDRs.

* * * * *